US008798607B1

(12) United States Patent
Kaplan et al.

(10) Patent No.: US 8,798,607 B1
(45) Date of Patent: Aug. 5, 2014

(54) METHOD AND APPARATUS FOR SYNCHRONIZING CONTACT AND CALENDAR INFORMATION BETWEEN A HANDSET AND A COMPUTING DEVICE

(75) Inventors: Diego Kaplan, San Diego, CA (US);
Larry P. Nolen, San Diego, CA (US);
Thinh V. Pham, San Diego, CA (US);
Jonathan Wine, Lakeside, CA (US)

(73) Assignee: KYOCERA Corporation, Kyoto (JP)

( * ) Notice: Subject to any disclaimer, the term of this patent is extended or adjusted under 35 U.S.C. 154(b) by 1639 days.

(21) Appl. No.: 11/773,167

(22) Filed: Jul. 3, 2007

(51) Int. Cl.
*H04M 3/00* (2006.01)

(52) U.S. Cl.
USPC ........ 455/418; 455/419; 455/420; 455/412.1; 455/412.2; 455/413

(58) Field of Classification Search
USPC ........... 455/420, 418, 419, 412.1, 412.2, 413, 455/414.1, 414.2, 414.4
See application file for complete search history.

(56) References Cited

U.S. PATENT DOCUMENTS

| | | | |
|---|---|---|---|
| 6,553,037 B1 * | 4/2003 | Pivowar et al. | 370/463 |
| 6,701,378 B1 * | 3/2004 | Gilhuly et al. | 709/249 |
| 6,873,841 B1 * | 3/2005 | Sagar | 455/414.4 |
| 6,879,997 B1 * | 4/2005 | Ketola et al. | 709/208 |
| 6,941,349 B2 * | 9/2005 | Godfrey et al. | 709/207 |
| 7,657,769 B2 * | 2/2010 | Marcy et al. | 713/375 |
| 2004/0058710 A1 * | 3/2004 | Timmins et al. | 455/560 |
| 2004/0237109 A1 * | 11/2004 | Laitinen et al. | 725/62 |
| 2005/0091272 A1 * | 4/2005 | Smith et al. | 707/104.1 |
| 2007/0232288 A1 * | 10/2007 | McFarland et al. | 455/423 |
| 2008/0091771 A1 * | 4/2008 | Allen et al. | 709/203 |
| 2009/0245749 A1 * | 10/2009 | Ueda et al. | 386/52 |

OTHER PUBLICATIONS

Internet Document "Nokia PC Suite 4.31 User Guide" at http://downloads.nokiausa.com/pcsuite/PCSuite4.31UG_v1.1.pdf (accessed Dec. 8, 2006).

* cited by examiner

*Primary Examiner* — Sharad Rampuria
*Assistant Examiner* — Sayed T Zewari

(57) ABSTRACT

Embodiments of the present invention provide for synchronizing contact and calendar information between a handset and a computer. For example, one method as disclosed herein allows the handset to import contact and calendar information from the computing device or to export the contact and the calendar information to the computing device. The computing device can be a PC or a new handset, for example. The importation and the exportation of the contact and calendar information includes a conversion process that occurs within the handset that transforms the contact and calendar information into a format suitable for the destination of the data.

20 Claims, 10 Drawing Sheets

METHOD AND APPARATUS FOR SYNCHRONIZING CONTACT AND CALENDAR INFORMATION BETWEEN A HANDSET AND A COMPUTING DEVICE

FIELD OF THE INVENTION

The present invention is directed toward information management and synchronization in a cellular telecommunications environment.

BACKGROUND

Software has become popular recently, which allows a user to not only send and receive e-mail messages on a personal computer, but also to keep an electronic address book of contacts and an electronic calendar with calendar information associated with upcoming events as well.

One of the most common problems for a new handset user is how to move their contacts from their previous handset or their computer to the new handset. Usually, a special program and cable is sold for a premium to do this.

Lately, programs that can do this over the air have been made available to handsets. For example, one scheme downloads contacts from a handset to a personal computer. The personal computer performs a conversion process to transform the contacts into a format suitable for the computer. The computer then transforms the contacts into a format suitable for a second handset. The personal computer then loads the converted contacts onto the second handset.

Another scheme uploads contacts from a handset to a server on the Internet. The server obtains format information from a second handset and if necessary converts the uploaded contacts into a format suitable for the second handset. The server then provides the converted contacts to the second handset.

These schemes are expensive and require either a personal computer or an Internet server as an intermediary between the two handsets. These schemes also require the intermediary to perform any needed conversions to make the contacts usable by the handsets. Therefore, what is needed is a system and method that reduces or overcomes these significant problems found in the current schemes as described above.

SUMMARY

Embodiments of the present invention are directed to synchronizing contact and calendar information between a handset and a computing device. In one embodiment, the computing device is a personal computer (PC) and the contact and calendar information is stored on the PC. The handset and the computing device have media cards and the media cards are configured with specialized directories having the contact and the calendar information in a common format.

The handset is capable of exporting contact or calendar information from persistent storage to a media card formatted memory and converting the contact or the calendar information from a handset compatible format to the common format. The handset is also capable of importing the contact or the calendar information from the media card formatted memory to the persistent storage and converting the contact or the calendar information from the common format to the handset compatible format. In one embodiment, the common format is a format that is suitable for a network or PC based personal information management (PIM) application, such as a comma separated value (CSV) file format, a virtual card (VCARD) file format, and/or a virtual calendar (VCAL) format.

In one embodiment, the specialized directories include directories for contact information and directories for calendar information. In another embodiment, a portion of the specialized directories are for exportation of contact and calendar information and a portion of the specialized directories are for importation of contact and calendar information. In another embodiment, the importation directories have subdirectories for replace all, update, and add new operations.

The handset is capable of importing or exporting files upon the occurrence of a synchronization condition. In various embodiments, the synchronization condition occurs upon reset of the handset or the computing device or upon start-up of the handset or the computing device. The synchronization condition can also occur upon receiving a selection from a user via a user interface.

Other features and advantages of the present invention will become more readily apparent to those of ordinary skill in the art after reviewing the following detailed description and accompanying drawings.

BRIEF DESCRIPTION OF THE DRAWINGS

The details of the present invention, both as to its structure and operation, may be gleaned in part by study of the accompanying drawings, in which like reference numerals refer to like parts, and in which.

DETAILED DESCRIPTION

Certain embodiments as disclosed herein provide for synchronizing contact and calendar information between a handset and a computing device. For example, one method as disclosed herein allows the handset to import contact and calendar information from the computing device or to export the contact and the calendar information to the computing device. The computing device can be a PC or a new handset, for example. The importation and the exportation of the contact and calendar information include a conversion process that occurs within the handset that transforms the contact and calendar information into a format suitable for the destination of the data.

After reading this description, it will become apparent to one skilled in the art how to implement the invention in various alternative embodiments and alternative applications. However, although various embodiments of the present invention are described herein, it is understood that these embodiments are presented by way of example only, and not limitation. As such, this detailed description of various alternative embodiments should not be construed to limit the scope or breadth of the present invention as set forth in the appended claims.

Figure 1:
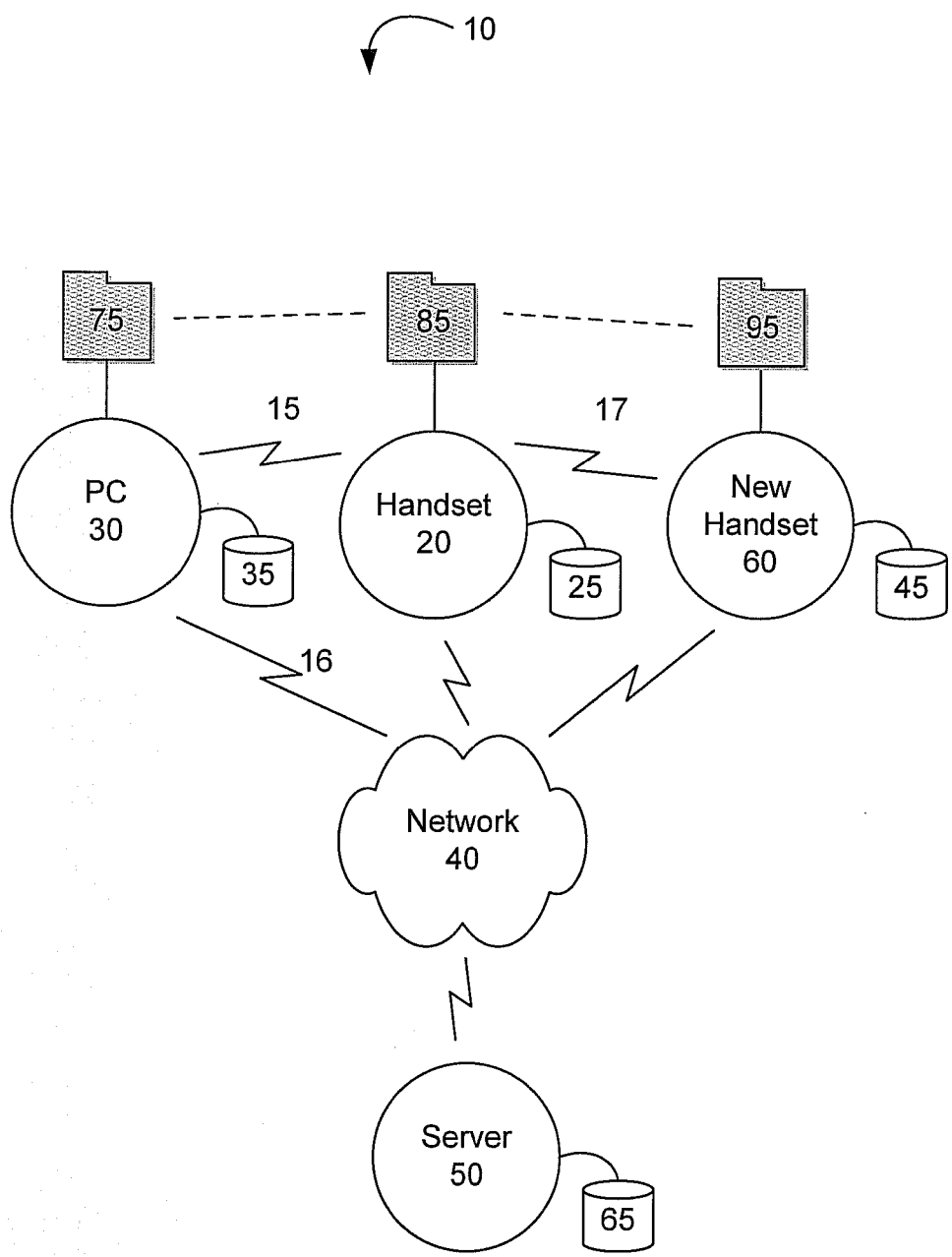
FIG. 1 is a network diagram illustrating an example system suitable for synchronizing contact and calendar information between a handset and a computing device according to an embodiment of the present invention.

FIG. 1 is a network diagram illustrating an example system suitable for synchronizing contact and calendar information between a handset and a computing device according to an embodiment of the present invention. In the illustrated embodiment, the system 10 comprises a network 40, a personal computer (PC) 30, a server 50, a handset 20, a new handset 60, and media card formatted memories 75, 85, and 95. The server 50 can be a PIM server, for example. The handset 20, the new handset 60, and the PC 30 are configured with respective data storage systems 25, 45, and 35.

The handset 20, the new handset 60, and the PC 30 are capable of being communicatively coupled with the server 50 via a network 40. The network 40 includes, for example, a wireless wide area network (WWAN) or a wireless local area network (WLAN). The WWAN is configured for voice and data communications over a wide geographical area, for example using a code division multiple access (CDMA) communication scheme or a global system for mobile communications (GSM) scheme.

The WLAN is configured for voice and data communications over a more limited geographical area, for example using one or more of the IEEE 802 communication standards such as 802.11a/b/g. The network 40 can also be communicatively coupled with a public or private network (not shown), which may include that particular aggregation of networks commonly known as the Internet.

The PC 30 can include a client application, such as an Internet browser that is capable of establishing a communicative coupling with the server 50. The PC 30 can also include a PIM application, such as Outlook, for managing personal information such as contact and calendar information.

The media card formatted memories 75, 85, and 95 are capable of being communicatively coupled with each of the other devices in FIG. 1, for example, by insertion into a dedicated slot or via a wired or wireless connection. Contact and calendar information can be stored on the media card formatted memories 75, 85, and 95 and transferred to the data storage systems 25, 35, and 45 and vice versa.

In one embodiment, the contact and calendar information is stored on the media card formatted memories 75, 85, and 95 in a common format. The common format can include, for example, a series of specialized directories on the media card formatted memories 75, 85, and 95 that make the media card formatted memories appear uniform to the handset 20, the new handset 60, and the PC 30.

The data storage systems 25, 35, and 45 can be any sort of internal or external memory device and may include both persistent and volatile memories, such as a flash memory or a database system, for example. The function of the respective data storage systems 25, 35, and 45 is to maintain data for long-term storage and also to provide efficient and fast access to contact and calendar information as well as instructions for applications that are executed by the respective devices.

The contact and calendar information can be transferred in a number of manners. For example, an indirect connection 16 can be established between the server 50 and the PC 30 and the contact and the calendar information can be transferred across the indirect connection via the network 40. The media card formatted memories 75, 85, and 95 can also be removed from one of the devices, such as the handset 20 or the PC 30 and inserted into another device, such as the new handset 60.

The contact and calendar information can also be transferred across a direct connection 15. The direct connection 15 can be wired or wireless. In one embodiment, the handset 20 supports a direct connection 15 that uses the media transport protocol (MTP). For example, the media card formatted memory 85 can be communicatively coupled to the PC 30 using the MTP, which causes it to appear as a removable hard drive on the PC 30. In another embodiment, the direct connection includes a serial cable and the handset 20 does not support the MTP protocol but includes an application configured to allow for the writing of the contact and calendar information to the specialized directories in the media card formatted memories 85 or 95 via the serial cable.

The contact and calendar information can also be transferred across a direct connection 17 between the handset 20 and the new handset 60. The direct connection 17 can include, for example, a Bluetooth or other over the air connection or a wired connection via a serial cable.

The handset 20 and the new handset 60 can include a client application, such as an Internet browser that is capable of establishing a communicative coupling with the server 50. The handset 20 and the new handset 60 can be any of a variety of wireless communication devices. This including, for example, a cell phone, personal digital assistant ("PDA"), personal computer ("PC"), laptop computer, PC card, special purpose equipment, or any combination of these and other devices capable of establishing a wireless communication link over a wireless communication network such as the network 40.

Figure 2:
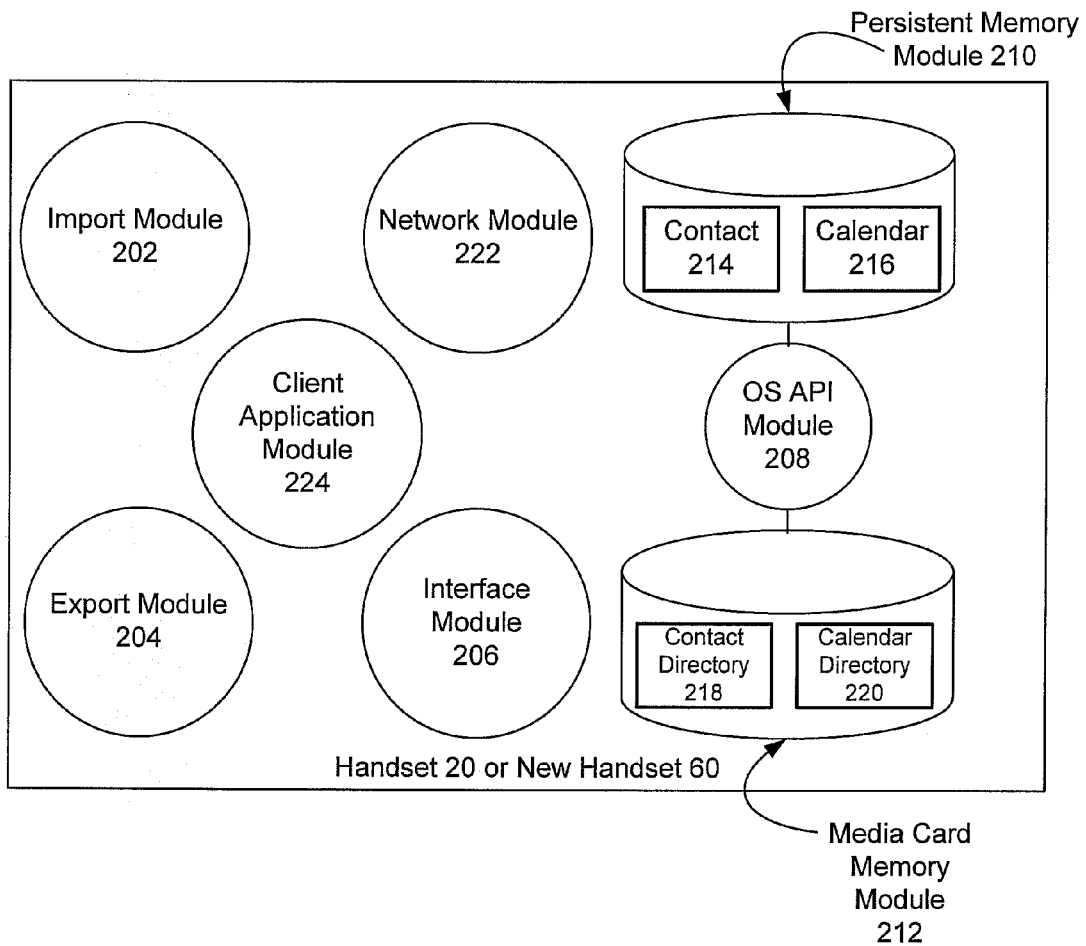
FIG. 2 is a block diagram illustrating an example handset according to an embodiment of the present invention.

FIG. 2 is a block diagram illustrating an example handset according to an embodiment of the present invention. In the illustrated embodiment, the handset 20 comprises an import module 202, an export module 204, an interface module 206, an operating system, application programming interface (OS API) module 208, a persistent memory module 210, a media card memory module 212, a client application module 224, and a network module 222. These various modules in the handset 20 can be implemented in software, hardware, or some combination of the two and are in communication with each other directly or indirectly through various inter-module interfaces.

It should be noted that many components that are included in the elements of FIGS. 1, 2, and the subsequent figures have been omitted to make the descriptions more clear. One will note that these omitted elements such as processors, network ports, memories, buses, transceivers, etc., would be included in such elements in a manner that is commonly known to those skilled in the art.

The network module 222 can be an application on the handset 20 that connects over the air to a network server. The persistent memory module 210 can be any type of non-volatile memory. For example, the persistent memory module 210 can be a flash memory, a read-only memory (ROM), a hard disk drive, or the like. The media card memory module 212 can be a removable memory and can be communicatively coupled to the persistent memory module 210.

The client application module 224 is an application that behaves like an Internet browser. The client application module 224 is capable of establishing a communicative coupling with the server 50. The communicative coupling can be used, for example, to access a network based email program that may contain contact or calendar information that resides on a network and can be imported to the handset 20.

The import module 202 and the export module 204 can be binary runtime environment for wireless (BREW) applications or JAVA applications, for example. The import module 202 and the export module 204 are configured to convert the contact and the calendar information from a handset compatible format to a common format, and vice versa. The import module 202 and the export module 204 are also configured to access the internal contact and calendar information in the persistent memory module 210 as well as the common formatted contact and calendar information in the media card memory module 212 via the OS API module 208. The import module 202 and the export module 204 are also configured to read and write the contact and the calendar information as well as to create the specialized directories in the media card memory module 212.

In one embodiment, the export module 204 is configured to create a series of specialized directories in an electronic file system (EFS) of the media card memory module 212. The creation of the specialized directories by the export module 204 allows for the transfer of the contact and the calendar information from the persistent memory module 210 to the media card memory module 212.

In one embodiment, the export module 204 creates a contact directory 218 where contact data 214 will reside, which is called EFS:/export/Contacts/contacts.vcf. In another embodiment, the export module 204 creates a calendar directory 220 where calendar information 216 will reside, which is called EFS:/export/Calendar/calendar.ics.

The export module 204 is also configured to perform a conversion process on the contact 214 or the calendar information 216 that resides in the appropriate directory 218 or 220 in the media card memory module 212. The export module 204 accesses the contact data 214 and the calendar information 216 and converts it to a comma separated value (CSV) file format, a virtual card (VCARD) file format, and/or a virtual calendar (VCAL) format. Typically, the handset 20 does not store the contact and calendar information in the CSV, VCARD, or VCAL formats in its internal data storage system, but stores it in a format suitable for the handset 20.

For example, the export module 204 can parse the contact and calendar information line by line and perform a mapping between the elements of the file in a format suitable for the handset 20 into a VCARD, VCAL, or CSV format. The mapping of the contact or calendar information to the VCARD, VCAL, or CSV format may include the BREW module 208 examining each field of the contact or calendar information in the handset compatible format and transforming it to VCARD, VCAL, or CSV. For example, in one embodiment a contact has a "name" field and a "photo" field with an associated picture in the handset. The conversion process might include copying the text associated with the name field to a corresponding name field in CSV and not copying the photo field from the handset.

In another embodiment, the import module 202 is configured to create the series of specialized directories in an electronic file system (EFS) of the media card memory module 212. The creation of the specialized directories by the import module 202 allows for transfer of the contact and the calendar information from the media card memory module 212 to the persistent memory.

In one embodiment, the import module 202 creates directories in the contact directory 218, which are called EFS:/Contact/Add/, EFS:/Contact/Update/, and EFSIContact/ReplaceAll/. EFS:/Contact/Add/ is a location where files reside that are intended to be added to the address book. EFS:/Contact/Update/ is a location where files reside that are intended to be updates for a matching contact in the address book. EFS:/Contact/ReplaceAll/ is intended to contain files designed to replace the entire address book.

In another embodiment, the import module 202 creates directories in the calendar directory 220, which are called EFS:/Calendar/Add/, EFS:/Calendar/Update/, and EFS:/Calendar/ReplaceAll/. EFS:/Calendar/Add/ is a location where files reside that are intended to be added to the calendar. EFS:/Contact/Update/ is a location where files reside that are intended to be updates for matching calendar information in the calendar. EFS:/Contact/ReplaceAll/ is intended to contain files designed to replace the entire calendar.

The import module 202 is configured to perform a conversion process on the contact or calendar information that resides in the appropriate directory 218 or 220 in the media card memory module 212. The import module 202 accesses the files in the directories 218 or 220, for example, in CSV, VCAL, or VCARD formats and converts them to a format suitable for the handset 20. The import module 202 then writes the converted files to the persistent memory of the handset 20.

The OS API module 208 is configured to access the contact and the calendar information in the handset 20 without exposing the internal formats of the handset 20. The OS API may be a BREW API or a JAVA API, for example, as well as any other API used for this purpose.

The interface module 206 allows the handset 20 to be connected to the PC 30, wherein the PC operating system shows a portion of the media card memory module 212 of the handset 20 as a virtual drive on the PC 30. The virtual drive allows the PC 30 to create, read and write directories and files to the media card memory module 212 of the handset 20.

Figure 3:
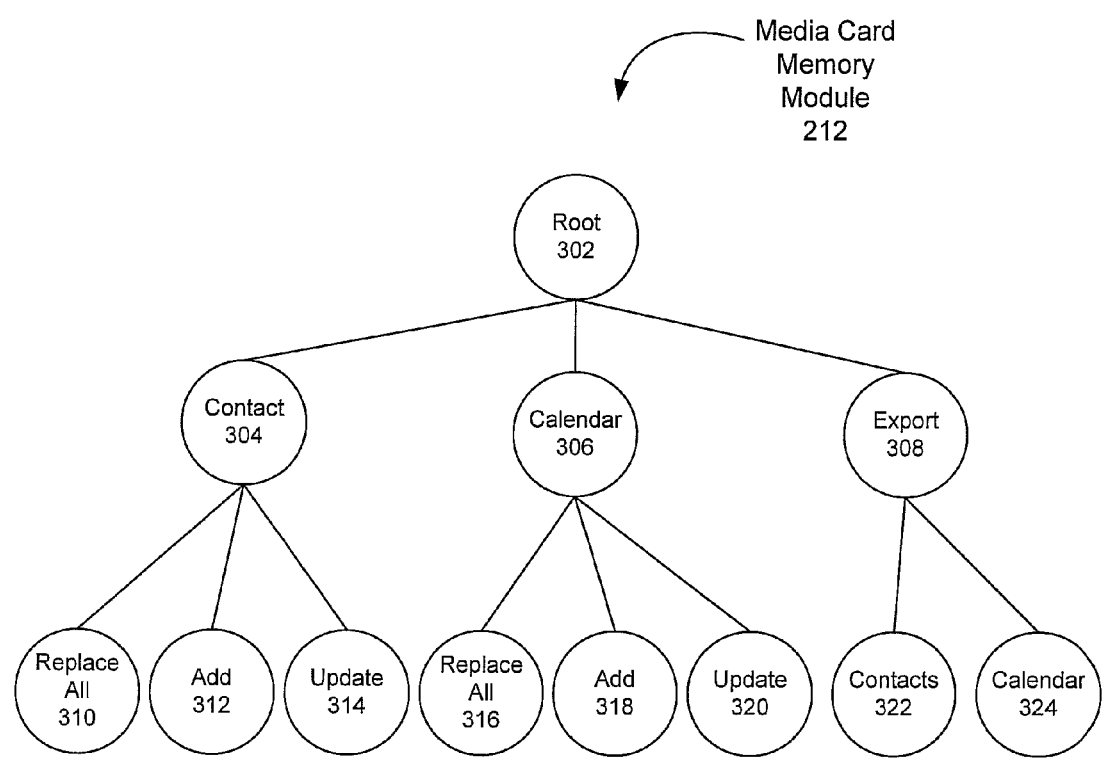
FIG. 3 is a diagram illustrating an example set of specialized directories created on the media card according to an embodiment of the present invention.

FIG. 3 is a diagram illustrating an example set of specialized directories created in the media card according to an embodiment of the present invention. The specialized directories include, for example, the directories created by the import module 202 and the export module 204 for the import and export of contact and calendar information. The diagram of FIG. 3 is typically created in the media card memory module 212, for example, of a handset 20 or a new handset 60.

The directory structure includes a root 302. At a level below the root 302 are a contact node 304, a calendar node 306, and an export node 308. The contact node 304 and the calendar node 306 are typically created by the import module 202 and are for storing files designed to be imported to the internal data storage system of the handset 20. The export node 308 is typically created by the export module 204 and is for storing files designed to be exported from the media card memory module 212 of the handset 20.

The export node 308 is a parent node of a contact node 322 and a calendar node 324. The contact node 322 is for storing the actual contacts that are to be exported from the handset 20. The calendar node 324 is for storing the actual calendar items that are to be exported from the handset 20.

The contact node 304 is a parent node of a replace all node 310, an add node 312, and an update node 314. The replace all node 310 includes files intended to replace all of the existing contact entries on the persistent memory module 210 of the handset 20. The add node 312 includes contact entries intended to be added the persistent memory module 210 of the handset 20 in addition to other contact entries that already reside in the persistent memory module 210. The update node 314 includes contact entries intended to change an existing contact entry in the persistent memory module 210 of the handset 20.

The calendar node 306 is a parent node of a replace all node 316, an add node 318, and an update node 320. The replace all node 316 includes files intended to replace all of the existing calendar information on the persistent memory module 210 of the handset 20. The add node 318 includes calendar information intended to be added the persistent memory module 210 of the handset 20 in addition to other calendar information that already resides in the persistent memory module 210. The update node 320 includes calendar information intended to change an existing calendar entry in the persistent memory module 210 of the handset 20.

Although FIG. 3 has been described as having a tree structure with nodes that branch out from the root node 302, other directory structures can be used as well. For example, any type of hierarchical file system can be implemented to achieve a similar specialized directory structure. Similarly, a flat file system can also be used as well as a non-hierarchical linking of files or directories.

Figure 4:
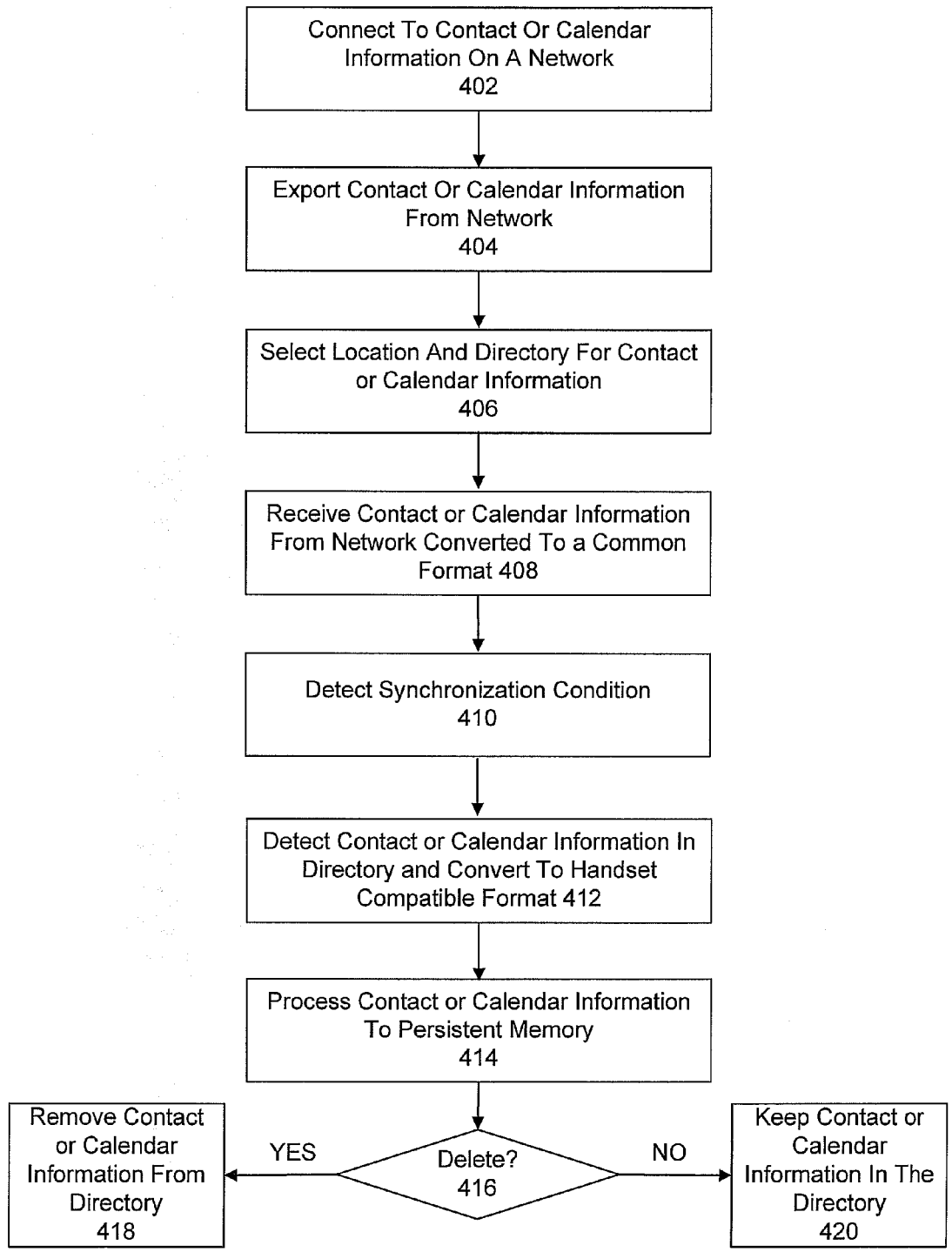
FIG. 4 is a diagram illustrating an example process for synchronizing contact and calendar information between a handset and a computing device according to an embodiment of the present invention.

FIG. 4 is a diagram illustrating an example process for synchronizing contact and calendar information between a handset and a computing device according to an embodiment of the present invention. The scenario in FIG. 4 includes the importing of contact or calendar information from a network, such as a PIM network. The process of FIG. 4 can be carried out, for example, by 1) an application in the PC 30 downloading the contact or the calendar information via the network 40 to the media card formatted memory 85 of the handset 20; or 2) the PC 30 downloading the contact or the calendar information via the network 40 to the media card formatted memory 95 of the PC 30; or 3) the handset 20 downloading the contact or the calendar information via the network 40 to the media card formatted memory 85.

In the case where the PC 30 downloads the contact or the calendar information via the network 40 to the media card formatted memory 85 of the handset 20, the handset 20 is connected to the PC 30 in mass storage mode and the PC 30 can see the media card formatted memory 85 as a virtual drive in the operating system. In the case where the PC 30 downloads the contact or the calendar information via the network 40 to the media card formatted memory 95 of the PC 30, the media card formatted memory 95 is installed as a virtual drive in the operating system. In the case where the handset 20 downloads the contact or the calendar information via the network 40 to the media card formatted memory 85, there is no connection to the PC 30.

In each of the three scenarios, a connection is made at step 402 to the contact or the calendar information via the network 40. For example, a browser application in the PC 30 or the client application module 224 of the handset 20 connects via the network to an email program such as Yahoo email. At step 404, the user exports the contact or the calendar information from the network. For example, if the user is accessing Yahoo email, the user follows the instructions of the network based email program to perform the export function and can select the common format to export the contact or calendar information, such as CSV, VCAL, or VCARD.

At step 406, the user selects the location and the directory for the contact or calendar information. For example, if the user intends to import the contact or calendar information as a complete replacement for existing contact or calendar information, then the user would choose "EFS:/Contact/ReplaceAll/" or "EFS:/Calendar/ReplaceAll/." Similarly, if the user intends to add a new contact or update an existing contact, the user selects the appropriate directory. The user also chooses the appropriate location, for example, the user would choose either the media card formatted memory 75 or 85 depending upon which of the above three scenarios is occurring.

Next, at step 408, the directory in the media card formatted memory receives the contact or the calendar information from the network converted to a common format. For example, in scenario 1, the network can convert the contact or the calendar information to a CSV, VCAL, or VCARD format and transfer it over the Internet to a browser in the PC 30 and the browser stores the contact or the calendar information in the media card formatted memory 85 of the handset 20 using the operating system virtual drive feature.

In scenario 2, the network can convert the contact or the calendar information to a CSV, VCAL, or VCARD format and transfer it over the Internet to a browser in the PC 30 and the browser stores the contact or the calendar information in the media card formatted memory 75 of the PC 30 and the media card formatted memory 75 is removed and installed in the handset 20 as the media card formatted memory 85.

In scenario 3, the network can convert the contact or the calendar information to a CSV, VCAL, or VCARD format and transfer it over the Internet to a browser in the handset 20 (e.g., the client application module 224) and the browser stores the contact or the calendar information in the media card formatted memory 85 of the handset 20.

At step 410, a synchronization condition is detected. In scenario 1, the synchronization condition is detected by handset 20 when the cable between PC 30 and handset 20 is disconnected. In scenario 2, the synchronization condition is detected by the handset 20 when media card formatted memory 85 of the handset 20 is installed. In scenario 3, the synchronization condition is detected by the handset 20 when the client application module 224 ends the download or when the client application module 224 is ended.

In all three scenarios, at step 412, the handset 20 detects the presence of the contact or the calendar information in the directory and the import module 202 converts the contact or calendar information to a handset compatible format. For example, the handset 20 reads the file and converts the information from CSV, VCAL, or VCARD format into the local format of the handset 20. Thereafter, at step 414, the handset 20 processes the contact or the calendar information to the persistent memory module 210. (It should be noted that the persistent memory module 210 as used herein is interchangeable with the data storage systems 25 and 45 of FIG. 1 depending on whether the persistent memory module 210 resides in the handset 20 or the new handset 60).

It should be noted that the contact or the calendar information can be in a EFS:/Calendar/Add/*.vcf, EFS:/Calendar/Update/*.vcf, EFS:/Calendar/ReplaceAll/*.Vcf, EFS:/Contact/Update/*.vcf, EFS:/Contact/ReplaceAll/*.Vcf, or EFS:/Contact/Add/*.vcf directories. Depending on the directories, the processing at step 414 will differ. For example, if the contact is in EFS:/Contact/ReplaceAll/*.Vcf, the handset 20 erases the contacts in the persistent memory module 210 and places the imported contacts residing in the directory into the persistent memory module 210. Similarly, if the contact is in EFS:/Contact/Add/*.Vcf, the handset 20 merges or includes a new contact with existing contacts in the persistent memory module 210.

It should also be noted that in other embodiments only one directory is needed and the name of the VCARD, VCAL, or CSV file itself determines the processing that will occur. For example, a contact can be named such that its name is indicative of a replace all, add, or update operation. In this embodiment, having separate sub-directories for each operation or for contact and calendar information is not required.

At step 416, the handset 20 determines if it should delete the contact or the calendar information in the directory. For example, a user interface may prompt the user whether the imported files should be deleted. Alternatively, the files may be automatically deleted to prevent recurring imports. If the user selects deletion of the files or if they are automatically deleted, then at step 418 the handset 20 removes the contact or the calendar information from the directory. If the user selects that the file should be kept, then after step 416, the contact or the calendar information is not removed from the directory, for example, when the media card formatted memory 85 is intended to be used as a distribution mechanism to update a number of devices.

Figure 5:
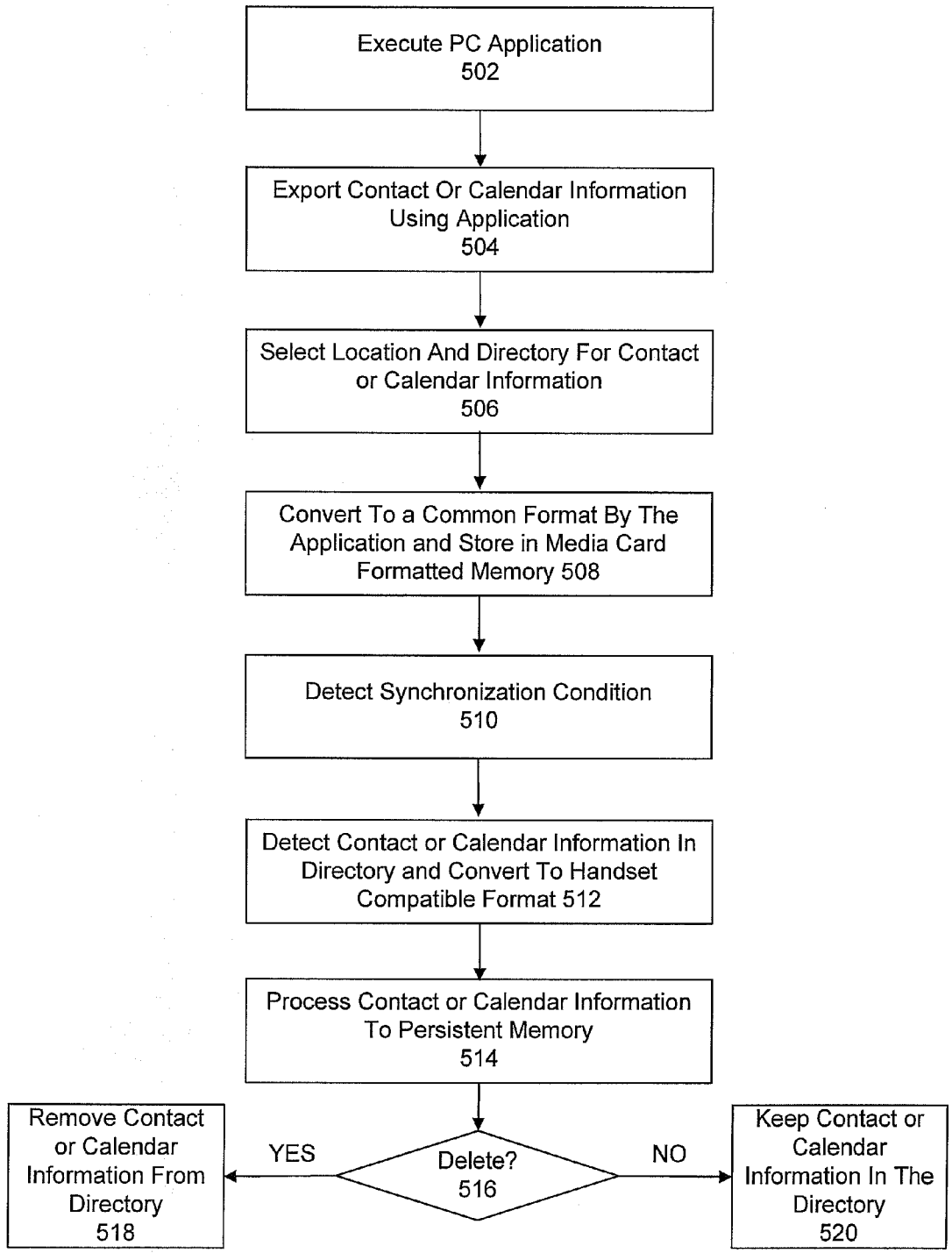
FIG. 5 is a diagram illustrating an example process for synchronizing contact and calendar information between a handset and a computing device according to an embodiment of the present invention.

FIG. 5 is a diagram illustrating an example process for synchronizing contact and calendar information between a handset and a computing device according to an embodiment of the present invention. The scenario in FIG. 5 includes the importing of contact or calendar information from a PIM application running on the PC 30. The process of FIG. 4 can be carried out, for example, by 1) the PC 30 transferring the contact or the calendar information to the media card formatted memory 75; or 2) the PC 30 transferring the contact or the calendar information to the media card formatted memory 85.

In the case where the PC 30 transferring the contact or the calendar information to the media card formatted memory 75, the media card formatted memory 75 is installed as a virtual drive of the operating system of the PC 30. In the case where the PC 30 is transferring the contact or the calendar information to the media card formatted memory 85, the handset 20 is connected to the PC 30 in mass storage mode and the PC 30 can see the media card formatted memory 85 as a virtual drive of the operating system of the PC 30.

In each of the two scenarios, the application on the PC 30 is executed. The application includes, for example, a PIM application such as Microsoft Outlook. Then, at step 504, the user exports the contact or the calendar information using the application features, which can include selecting a common format to export the contact or calendar information, such as CSV, VCAL, or VCARD.

At step 506, the user selects the location and the directory for the contact or calendar information. For example, in scenario 1, the location to save the contact or the calendar information is selected to be in the virtual drive showing the media card formatted memory 75. In scenario 2, the location to save the contact or the calendar information is selected to be in the virtual drive showing the media card formatted memory 85. The precise subdirectory for the file depends on whether it is a contact or calendar information and whether the operation is add, update, or replace all.

At step 508, the application converts the contact or the calendar information to a CSV, VCAL, or VCARD format and stores it in either the media card formatted memory 75 or the media card formatted memory 85 depending on the scenario. At step 510, a synchronization condition is detected. In scenario 1, this occurs, for example, when the media card formatted memory 75 is removed and installed in the handset 20 as the media card formatted memory 85. In scenario 2, the synchronization condition occurs when the when a cable between the PC 30 and handset 20 is disconnected.

In both scenarios, at step 512, the handset 20 detects the presence of the contact or the calendar information in the directory of either of the media card formatted memories 75 or 85 and the import module 202 converts the contact or calendar information to a handset compatible format. For example, the handset 20 reads the file and converts the information from CSV, VCAL, or VCARD format into the local format of the handset 20. Thereafter, at step 514, the handset 20 processes the contact or the calendar information to the persistent memory module 210 via the OS API module 208.

At step 516, the handset 20 determines if it should delete the contact or the calendar information in the directory. If the user selects deletion of the files or if they are automatically deleted, then at step 518 the handset 20 removes the contact or the calendar information from the directory. If the user selects that the file should be kept, then after step 516, the contact or the calendar information is not removed from the directory.

Figure 6:
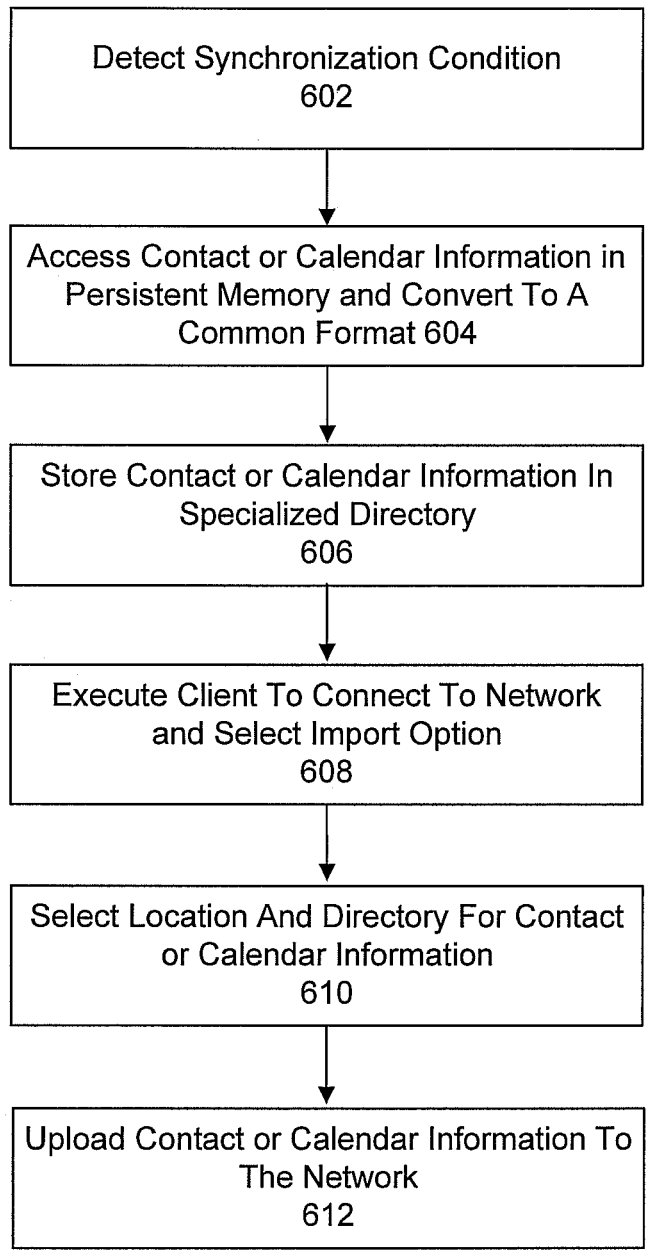
FIG. 6 is a diagram illustrating an example process for synchronizing contact and calendar information between a handset and a computing device according to an embodiment of the present invention.

FIG. 6 is a diagram illustrating an example process for synchronizing contact and calendar information between a handset and a computing device according to an embodiment of the present invention. The scenario in FIG. 6 includes the exporting of contact or calendar information to a PIM network. The process of FIG. 6 can be carried out, for example, by the export of the contact or the calendar information to the media card formatted memory 85 and then either 1) a browser network import from the media card formatted memory 85; 2) a browser network import from the media card formatted memory 75; or 3) a client application module 224 on the handset 20 import from the media card formatted memory 85.

In all three scenarios, the handset 20 is initially not connected to the PC 30 in mass storage mode in order to enable a user interface on the handset 20. At step 602, a synchronization condition is detected. The synchronization condition can be detected, for example, when the user selects a feature on the handset 20 for exporting the contact or the calendar information or when an autonomous event occurs, such as periodic time or whenever the contact or calendar information is changed.

In another embodiment, an executable file can be placed in the export directory. The executable can be compiled for the destination-computing device. When the synchronization condition is detected, the executable is launched and it sends a command to trigger the export.

In one embodiment, a "diag" or "AT" command can be sent from the handset 20 which initiates the export of the contact or the calendar information automatically without requiring the user to manually trigger the export through a user interface menu or having the handset 20 be reset or started-up again.

At step 604, the export module 204 accesses the contact or calendar information in the persistent memory module 210, for example using the OS API module 208, and converts it from a handset compatible format to a common format such as CSV, VCAL, or VCARD. The common format can be pre-selected or all of the common formats can be used. Thereafter, at step 606, the handset 20 stores the contact or the calendar information in the specialized directory of the media formatted memory card 85 (e.g., export/contact or export/calendar).

At step 608, the client is executed to connect to the network. In scenario 1, this includes, for example, connecting the PC 30 and the handset 20 using mass storage mode. This causes the PC 30 to be able to see the media card formatted memory 85 as a virtual drive in the operating system. A network browser (e.g., Internet Explorer) of the PC 30 is then executed and links to a network email program, such as Yahoo Email. In scenario 2, this includes, for example, removing the media card formatted memory 85 from the handset 20 and installing it on the PC 30 as the media card formatted memory 75. This causes the PC 30 to be able to see the media card formatted memory 75 as a virtual drive in the operating system. A network browser (e.g., Internet Explorer) of the PC 30 is then executed and links to a network email program, such as Yahoo Email. In scenario 3, this includes, for example, the client application module 224 on the handset 20 being executed, which links to a network email program.

At step 610, the location and the directory for the contact or the calendar information is selected and the user imports the contact or the calendar information following the web pages of the network email program. Step 610 may also include the user selecting a common format such as CSV, VCAL, or VCARD. The location includes either the media card formatted memory 85 (scenarios 1 and 3) or the media card formatted memory 75 (scenario 2) and the directory is the appropriate export directory depending on the operation being performed.

Thereafter, at step 612, the contact or calendar information is selected from the export directory and uploaded to the network. In scenario 1, this includes transferring the contact or the calendar information over the Internet from the media card formatted memory card 85 by the browser of the PC 30 to a network server, where contact or calendar information is converted in the server from the common format into the server's local format. In scenario 2, this includes transferring the contact or the calendar information over the Internet from the media card formatted memory card 75 by the browser of the PC 30 to a network server, where contact or calendar information is converted in the server from the common format into the server's local format. In scenario 3, this includes transferring the contact or the calendar information over the Internet from the media card formatted memory card 85 by the client application module 224 to a network server, where contact or calendar information is converted in the server from the common format into the server's local format.

Figure 7:
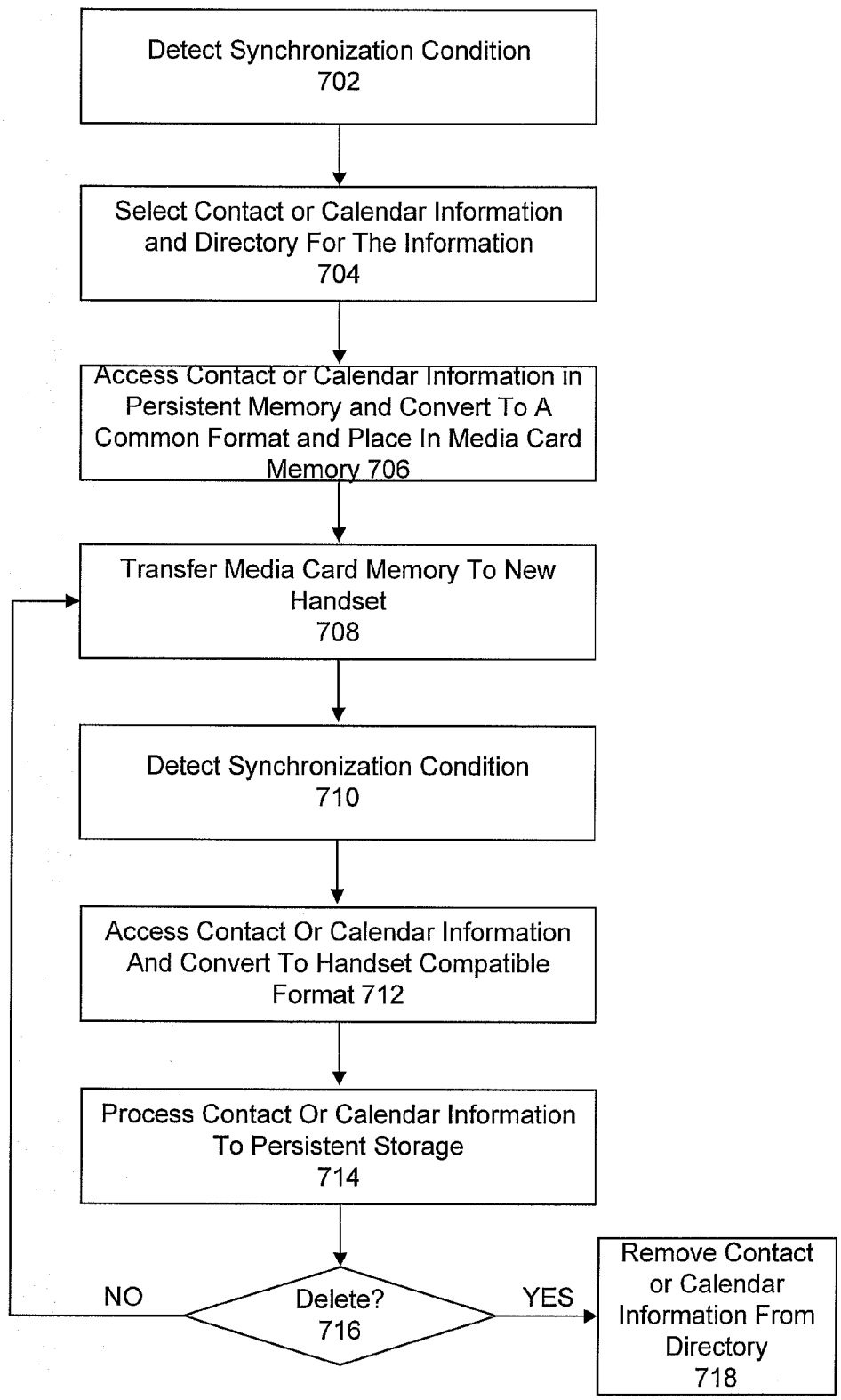
FIG. 7 is a diagram illustrating an example process for synchronizing contact and calendar information between a handset and a computing device according to an embodiment of the present invention.

FIG. 7 is a diagram illustrating an example process for synchronizing contact and calendar information between a handset and a computing device according to an embodiment of the present invention. The scenario in FIG. 7 includes the exporting of contact or calendar information to the new handset 60 via the media card formatted memory 85. The process includes exporting the contact or the calendar information to a specialized import directory on the handset 20 and then importing the contact or calendar information to the new handset 60.

At step 702, a synchronization condition is detected. The synchronization condition can be detected, for example, when the user selects a feature on the handset for exporting the contact or the calendar information or when an autonomous event occurs, such as periodic time or whenever a contact or calendar information is changed. At step 704, the location and the directory for the contact or the calendar information is selected. In the present scenario the location is the media card formatted memory 85 and the directory is the import/contact or the import/calendar directory.

At step 706, the contact or calendar information is accessed in the persistent memory module 210 by the OS API module 208, converted from the handset suitable format to the common format by the export module 204, and placed in the media card formatted memory 85. At step 708, the media card formatted memory 85 is removed from the handset 20 and installed into the new handset 60 as the media card formatted memory 95.

At step 710, a synchronization condition is detected by the new handset 60 when the media card formatted memory 85 is installed in the new handset 60. In response, the contact or the calendar information is accessed and converted to a handset compatible format at step 712 by the import module 202 of the new handset 60. At step 714, the new handset 60 processes the contact or the calendar information to the persistent memory module using the OS API module 208.

This includes detecting the presence of the contact information in the "import/contact/" directory of the media card formatted memory 95 or detecting the presence of the calendar information in the "import/calendar/" directory of the media card formatted memory 95. This also includes the new handset 60 reading the contact or the calendar information and converting it from the common format into the format suitable for the new handset 60 by the import module 202.

If the action is a "replace all" action for contacts, for example, then the OS API 208 of the new handset 60 erases the contacts in the persistent memory module 210 and places the imported information into the persistent memory module 210. At step 716, the new handset 60 determines if it should delete the contact or the calendar information in the directory. If the user selects deletion of the files or if they are automatically deleted, then at step 718 the new handset 60 removes the contact or the calendar information from the directory. If the user selects that the file should be kept, then after step 716, the process repeats at step 708 because the user intends to use the media card formatted memory as a distribution mechanism to update a number of handsets.

Figure 8:
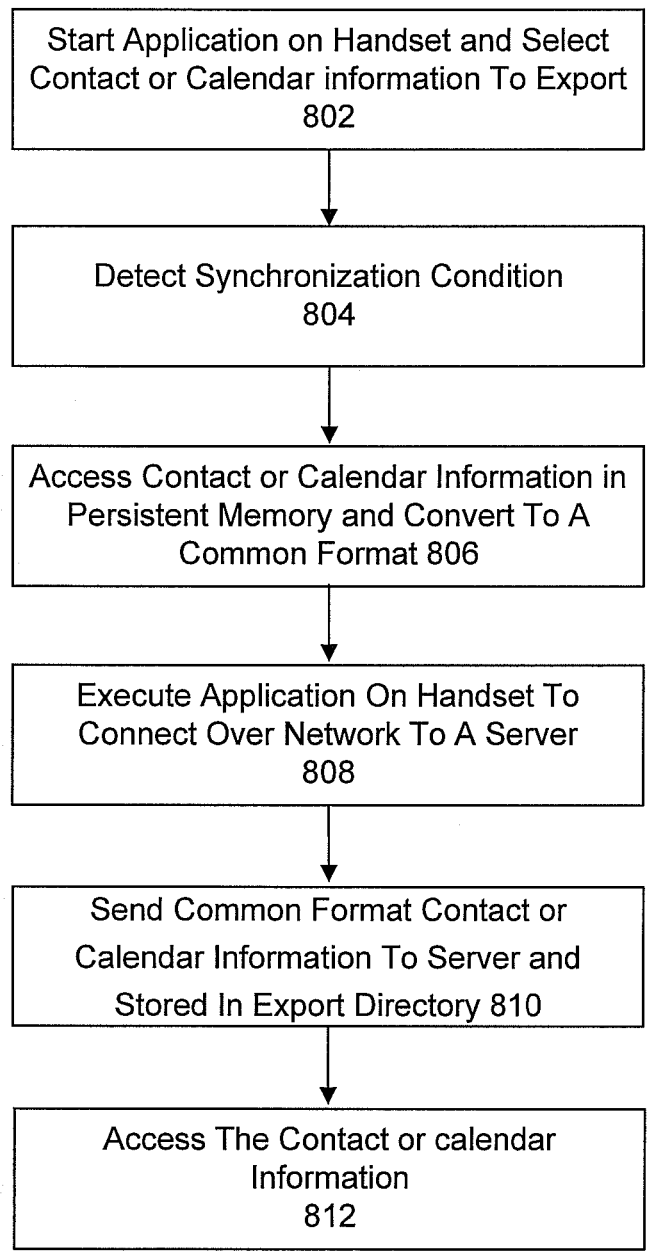
FIG. 8 is a diagram illustrating an example process for synchronizing contact and calendar information between a handset and a computing device according to an embodiment of the present invention.

FIG. 8 is a diagram illustrating an example process for synchronizing contact and calendar information between a handset and a computing device according to an embodiment of the present invention. The scenario in FIG. 8 includes the exporting of contact or calendar information from a handset to a server. The process includes exporting the contact or the calendar information to a specialized export directory on the server. FIG. 8 does not require the use of a media card formatted memory.

At step 802, a user starts an application on the handset and selects a contact to export. Alternatively, the user can select all contacts to be exported. At step 804 a synchronization condition is detected. The synchronization condition can be detected, for example, when the user selects a feature on the handset for exporting the contact or the calendar information or when an autonomous event occurs, such as periodic time or whenever a contact or calendar information is changed.

At step 806, the contact or calendar information is accessed, for example in the persistent memory module 210 by the OS API module 208 and converted from the handset suitable format to the common format by the export module 204. At step 808, an application is run on the handset, which connects over a network to the server 50. At step 810, the application on the handset sends the common format contact or calendar information to the server 50 so that the information is stored into an "/export/contact/" directory in a data storage system 65 of the server 50. Thereafter, at step 812, the user or another application can then access the contact or calendar information.

Figure 9:
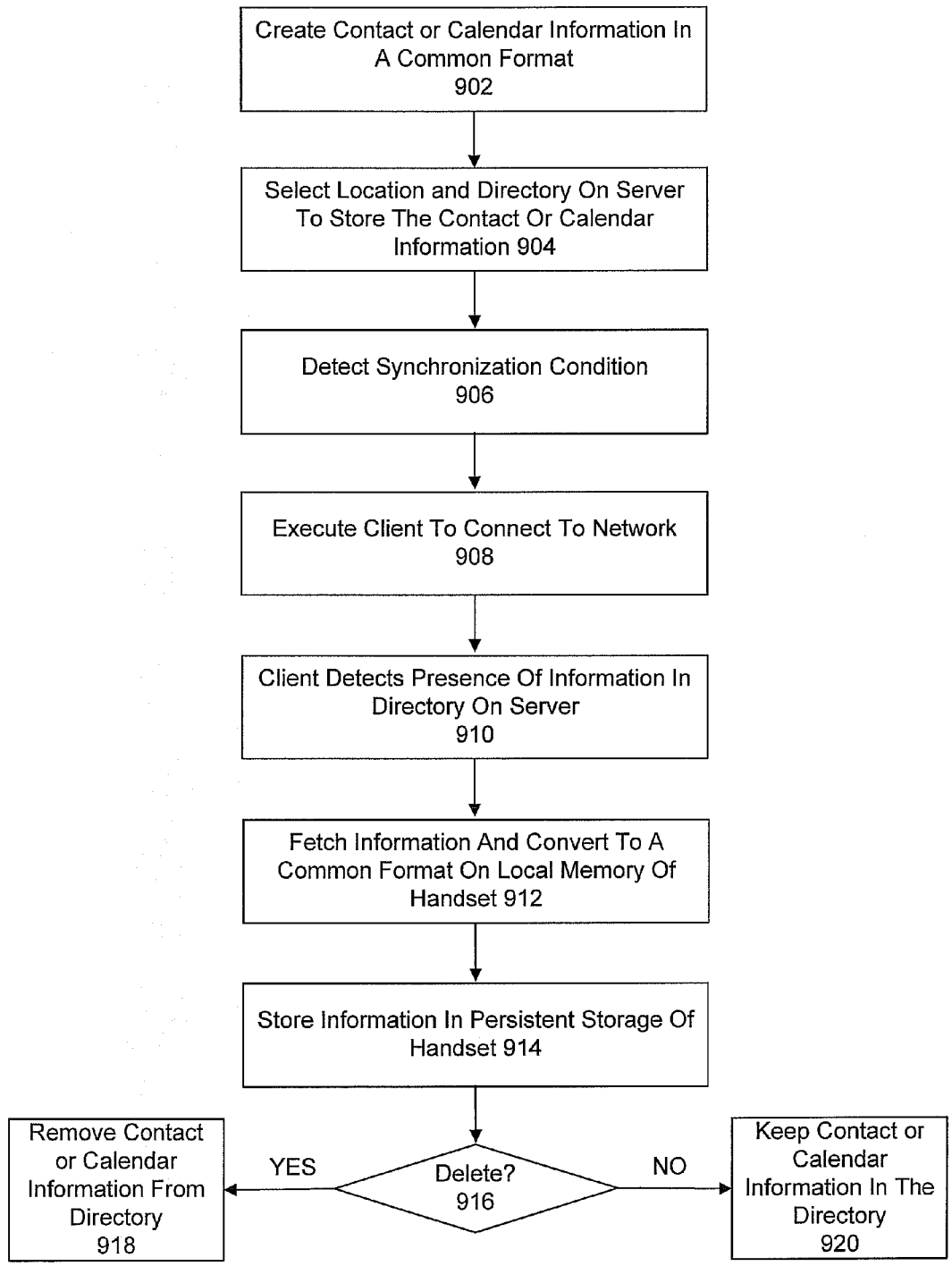
FIG. 9 is a diagram illustrating an example process for synchronizing contact and calendar information between a handset and a computing device according to an embodiment of the present invention.

FIG. 9 is a diagram illustrating an example process for synchronizing contact and calendar information between a handset and a computing device according to an embodiment of the present invention. The scenario in FIG. 9 includes the importing of contact or calendar information directly from a server. FIG. 9 does not require the use of a media card formatted memory.

At step 902, the user or an application creates the contact or calendar information in a common format, for example by converting the information from another format into the common format. Alternatively, the contact or calendar information can already be in the common format so step 902 may not be needed in one embodiment.

At step 904, a location and a directory to save the contact or calendar information is selected. The location can be on the server 50 in the data storage system 65. The directory to save the contact or calendar information can be a "/contact/ReplaceAll/" directory. At step 906, a synchronization condition is detected. The synchronization condition can be detected, for example, when the user selects a feature on the handset or when an autonomous event occurs, such as the handset receiving a message from the network.

At step 908, an application is run on the handset, which connects over a network to the server 50. Thereafter, the application on the handset detects the presence of a file or files in the "contact/ReplaceAll/" directory of the data storage system 65 of the server 50 at step 910.

At step 912, the application fetches the contact or calendar information from the server and writes it into local memory and the handset converts the contact or calendar information from the common format into a format compatible with the handset. At step 914, the handset processes the contact or calendar information and stored it to persistent memory.

Thereafter, at step 916, the handset determines if it should delete the contact or the calendar information in the directory on the server. If the user selects deletion of the files on the server, then at step 918 the handset instructs the server 50 to remove the contact or the calendar information from the directory to prevent recurring imports. If the user selects that the file should be kept, then after step 920, the contact or the calendar information is not removed from the directory on the server.

Figure 10:
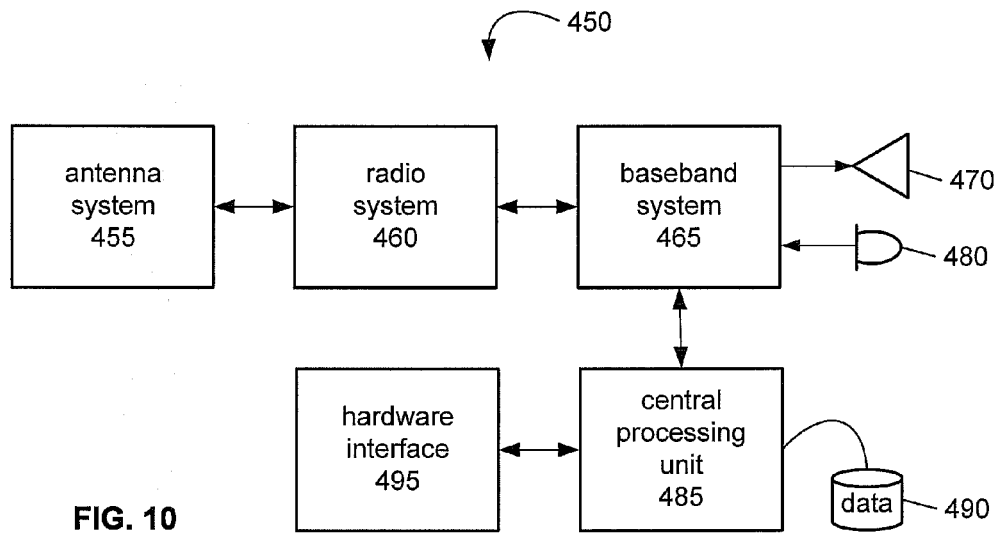
FIG. 10 is a block diagram illustrating an example wireless communication device that may be used in connection with various embodiments described herein.

FIG. 10 is a block diagram illustrating an example handset 450 that may be used in connection with various embodiments described herein. For example, the handset 450 may be used in conjunction with the handset 20 and the new handset 60 described in FIG. 1. However, other wireless communication devices and/or architectures may also be used, as will be clear to those skilled in the art.

In the illustrated embodiment, the handset 450 comprises an antenna system 455, a radio system 460, a baseband system 465, a speaker 464, a microphone 470, a central processing unit ("CPU") 485, a data storage area 490, and a hardware interface 495. In the handset 450, radio frequency ("RF") signals are transmitted and received over the air by the antenna system 455 under the management of the radio system 460.

In one embodiment, the antenna system 455 may comprise one or more antennae and one or more multiplexors (not shown) that perform a switching function to provide the antenna system 455 with transmit and receive signal paths. In the receive path, received RF signals can be coupled from a multiplexor to a low noise amplifier (not shown) that amplifies the received RF signal and sends the amplified signal to the radio system 460.

In alternative embodiments, the radio system 460 may comprise one or more radios that are configured to communication over various frequencies. In one embodiment, the radio system 460 may combine a demodulator (not shown) and modulator (not shown) in one integrated circuit ("IC"). The demodulator and modulator can also be separate components. In the incoming path, the demodulator strips away the RF carrier signal leaving a baseband receive audio signal, which is sent from the radio system 460 to the baseband system 465.

If the received signal contains audio information, then baseband system 465 decodes the signal and converts it to an analog signal. Then the signal is amplified and sent to the speaker 470. The baseband system 465 also receives analog audio signals from the microphone 480. These analog audio signals are converted to digital signals and encoded by the baseband system 465. The baseband system 465 also codes the digital signals for transmission and generates a baseband transmit audio signal that is routed to the modulator portion of the radio system 460. The modulator mixes the baseband transmit audio signal with an RF carrier signal generating an RF transmit signal that is routed to the antenna system and may pass through a power amplifier (not shown). The power amplifier amplifies the RF transmit signal and routes it to the antenna system 455 where the signal is switched to the antenna port for transmission.

The baseband system 465 is also communicatively coupled with the central processing unit 485. The central processing unit 485 has access to a data storage area 490. The central processing unit 485 is preferably configured to execute instructions (i.e., computer programs or software) that can be stored in the data storage area 490. Computer programs can also be received from the baseband processor 465 and stored in the data storage area 490 or executed upon receipt. Such computer programs, when executed, enable the handset 450 to perform the various functions of the present invention as previously described. For example, data storage area 490 may include various software modules (not shown) that were previously described with respect to FIG. 2.

In this description, the term "computer readable medium" is used to refer to any media used to provide executable instructions (e.g., software and computer programs) to the handset 450 for execution by the central processing unit 485. Examples of these media include the data storage area 490, microphone 470 (via the baseband system 465), antenna system 455 (also via the baseband system 465), and hardware interface 495. These computer readable mediums are means for providing executable code, programming instructions, and software to the handset 450. The executable code, programming instructions, and software, when executed by the central processing unit 485, preferably cause the central processing unit 485 to perform the inventive features and functions previously described herein.

The central processing unit 485 is also preferably configured to receive notifications from the hardware interface 495 when new devices are detected by the hardware interface. Hardware interface 495 can be a combination electromechanical detector with controlling software that communicates with the CPU 485 and interacts with new devices. The hardware interface 495 may be a firewire port, a USB port, a Bluetooth or infrared wireless unit, or any of a variety of wired or wireless access mechanisms. Examples of hardware that may be linked with the handset 450 include data storage devices, computing devices, headphones, microphones, and the like.

Figure 11:
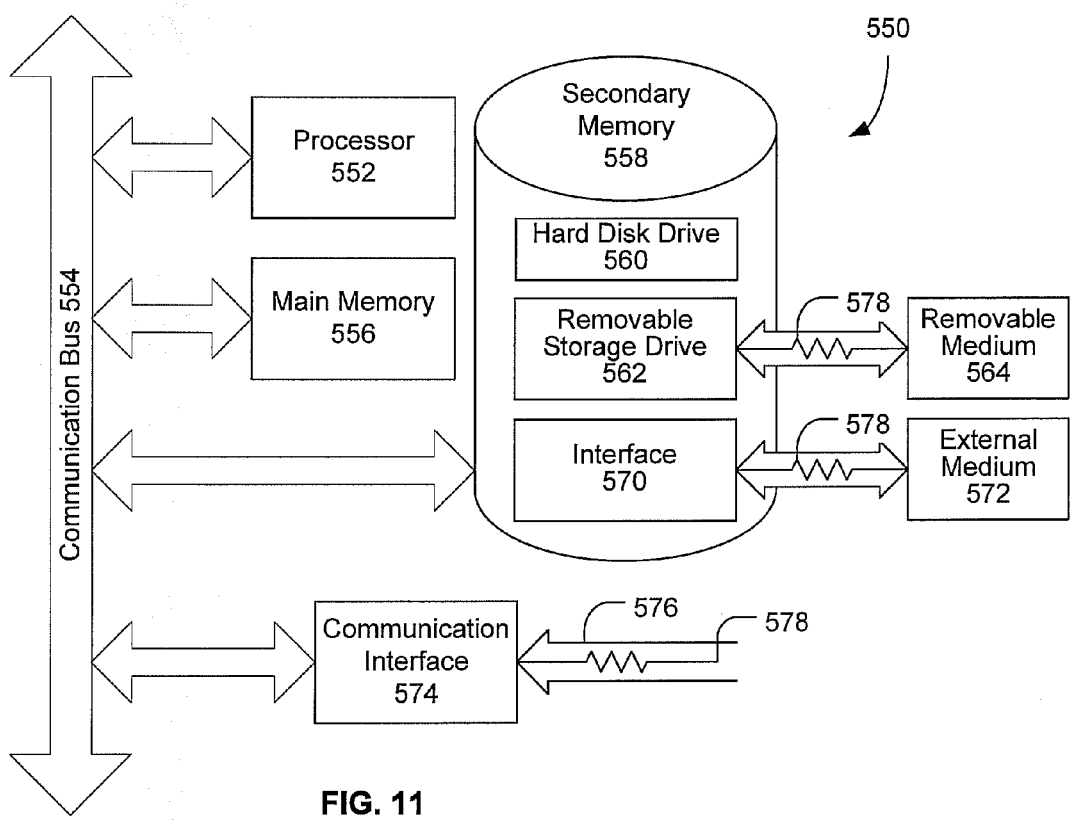
FIG. 11 is a block diagram illustrating an example computer system that may be used in connection with various embodiments described herein.

FIG. 11 is a block diagram illustrating an example computer system 550 that may be used in connection with various embodiments described herein. For example, the computer system 550 may be used in conjunction with the PC 30 and the server 50 described in FIG. 1. However, other computer systems and/or architectures may be used, as will be clear to those skilled in the art.

The computer system 550 preferably includes one or more processors, such as processor 552. Additional processors may be provided, such as an auxiliary processor to manage input/output, an auxiliary processor to perform floating point mathematical operations, a special-purpose microprocessor having an architecture suitable for fast execution of signal processing algorithms (e.g., digital signal processor), a slave processor subordinate to the main processing system (e.g., back-end processor), an additional microprocessor or controller for dual or multiple processor systems, or a coprocessor. Such auxiliary processors may be discrete processors or may be integrated with the processor 552.

The processor 552 is preferably connected to a communication bus 554. The communication bus 554 may include a data channel for facilitating information transfer between storage and other peripheral components of the computer system 550. The communication bus 554 further may provide a set of signals used for communication with the processor 552, including a data bus, address bus, and control bus (not shown). The communication bus 554 may comprise any standard or non-standard bus architecture such as, for example, bus architectures compliant with industry standard architecture ("ISA"), extended industry standard architecture ("EISA"), Micro Channel Architecture ("MCA"), peripheral component interconnect ("PCI") local bus, or standards promulgated by the Institute of Electrical and Electronics Engineers ("IEEE") including IEEE 488 general-purpose interface bus ("GPIB"), IEEE 696/S-100, and the like.

Computer system 550 preferably includes a main memory 556 and may also include a secondary memory 558. The main memory 556 provides storage of instructions and data for programs executing on the processor 552. The main memory 556 is typically semiconductor-based memory such as dynamic random access memory ("DRAM") and/or static random access memory ("SRAM"). Other semiconductor-based memory types include, for example, synchronous dynamic random access memory ("SDRAM"), Rambus dynamic random access memory ("RDRAM"), ferroelectric random access memory ("FRAM"), and the like, including read only memory ("ROM").

The secondary memory 558 may optionally include a hard disk drive 560 and/or a removable storage drive 562, for example a floppy disk drive, a magnetic tape drive, a compact disc ("CD") drive, a digital versatile disc ("DVD") drive, etc. The removable storage drive 562 reads from and/or writes to a removable storage medium 564 in a well-known manner. Removable storage medium 564 may be, for example, a floppy disk, magnetic tape, CD, DVD, etc.

The removable storage medium 564 is preferably a computer readable medium having stored thereon computer executable code (i.e., software) and/or data. The computer software or data stored on the removable storage medium 564 is read into the computer system 550 as electrical communication signals 578.

In alternative embodiments, secondary memory 558 may include other similar means for allowing computer programs or other data or instructions to be loaded into the computer system 550. Such means may include, for example, an external storage medium 572 and an interface 570. Examples of external storage medium 572 may include an external hard disk drive or an external optical drive, or and external magneto-optical drive.

Other examples of secondary memory 558 may include semiconductor-based memory such as programmable read-only memory ("PROM"), erasable programmable read-only memory ("EPROM"), electrically erasable read-only memory ("EEPROM"), or flash memory (block oriented memory similar to EEPROM). Also included are any other removable storage units 572 and interfaces 570, which allow software and data to be transferred from the removable storage unit 572 to the computer system 550.

Computer system 550 may also include a communication interface 574. The communication interface 574 allows software and data to be transferred between computer system 550 and external devices (e.g. printers), networks, or information sources. For example, computer software or executable code may be transferred to computer system 550 from a network server via communication interface 574. Examples of communication interface 574 include a modem, a network interface card ("NIC"), a communications port, a PCMCIA slot and card, an infrared interface, and an IEEE 1394 fire-wire, just to name a few.

Communication interface 574 preferably implements industry promulgated protocol standards, such as Ethernet IEEE 802 standards, Fiber Channel, digital subscriber line ("DSL"), asynchronous digital subscriber line ("ADSL"), frame relay, asynchronous transfer mode ("ATM"), integrated digital services network ("ISDN"), personal communications services ("PCS"), transmission control protocol/Internet protocol ("TCP/IP"), serial line Internet protocol/point to point protocol ("SLIP/PPP"), and so on, but may also implement customized or non-standard interface protocols as well.

Software and data transferred via communication interface 574 are generally in the form of electrical communication signals 578. These signals 578 are preferably provided to communication interface 574 via a communication channel 576. Communication channel 576 carries signals 578 and can be implemented using a variety of wired or wireless communication means including wire or cable, fiber optics, conventional phone line, cellular phone link, wireless data communication link, radio frequency (RF) link, or infrared link, just to name a few.

Computer executable code (i.e., computer programs or software) is stored in the main memory 556 and/or the secondary memory 558. Computer programs can also be received via communication interface 574 and stored in the main memory 556 and/or the secondary memory 558. Such computer programs, when executed, enable the computer system 550 to perform the various functions of the present invention as previously described.

In this description, the term "computer readable medium" is used to refer to any media used to provide computer executable code (e.g., software and computer programs) to the computer system 550. Examples of these media include main memory 556, secondary memory 558 (including hard disk drive 560, removable storage medium 564, and external storage medium 572), and any peripheral device communicatively coupled with communication interface 574 (including a network information server or other network device). These computer readable mediums are means for providing executable code, programming instructions, and software to the computer system 550.

In an embodiment that is implemented using software, the software may be stored on a computer readable medium and loaded into computer system 550 by way of removable storage drive 562, interface 570, or communication interface 574. In such an embodiment, the software is loaded into the computer system 550 in the form of electrical communication signals 578. The software, when executed by the processor 552, preferably causes the processor 552 to perform the inventive features and functions previously described herein.

Various embodiments may also be implemented primarily in hardware using, for example, components such as application specific integrated circuits ("ASICs"), or field programmable gate arrays ("FPGAs"). Implementation of a hardware state machine capable of performing the functions described herein will also be apparent to those skilled in the relevant art. Various embodiments may also be implemented using a combination of both hardware and software.

Furthermore, those of skill in the art will appreciate that the various illustrative logical blocks, modules, circuits, and method steps described in connection with the above described figures and the embodiments disclosed herein can often be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled persons can implement the described functionality in varying ways for each particular application, but such implementation decisions should not be interpreted as causing a departure from the scope of the invention. In addition, the grouping of functions within a module, block, circuit or step is for ease of description. Specific functions or steps can be moved from one module, block or circuit to another without departing from the invention.

Moreover, the various illustrative logical blocks, modules, and methods described in connection with the embodiments disclosed herein can be implemented or performed with a general purpose processor, a digital signal processor ("DSP"), an ASIC, FPGA or other programmable logic device, discrete gate or transistor logic, discrete hardware components, or any combination thereof designed to perform the functions described herein. A general-purpose processor can be a microprocessor, but in the alternative, the processor can be any processor, controller, microcontroller, or state machine. A processor can also be implemented as a combination of computing devices, for example, a combination of a DSP and a microprocessor, a plurality of microprocessors, one or more microprocessors in conjunction with a DSP core, or any other such configuration.

Additionally, the steps of a method or algorithm described in connection with the embodiments disclosed herein can be embodied directly in hardware, in a software module executed by a processor, or in a combination of the two. A software module can reside in RAM memory, flash memory, ROM memory, EPROM memory, EEPROM memory, registers, hard disk, a removable disk, a CD-ROM, or any other form of storage medium including a network storage medium. An exemplary storage medium can be coupled to the processor such the processor can read information from, and write information to, the storage medium. In the alternative, the storage medium can be integral to the processor. The processor and the storage medium can also reside in an ASIC.

The above description of the disclosed embodiments is provided to enable any person skilled in the art to make or use the invention. Various modifications to these embodiments will be readily apparent to those skilled in the art, and the generic principles described herein can be applied to other embodiments without departing from the spirit or scope of the invention. Thus, it is to be understood that the description and drawings presented herein represent a presently preferred embodiment of the invention and are therefore representative of the subject matter, which is broadly contemplated by the present invention. It is further understood that the scope of the present invention fully encompasses other embodiments that may become obvious to those skilled in the art and that the scope of the present invention is accordingly limited by nothing other than the appended claims.

What is claimed is:

1. A method for synchronizing contact or calendar information between a handset and a computing device comprising:
   receiving exported contact or calendar information from a network server;
   storing, in a directory location selected by a user, the contact or the calendar information in a directory of a media card formatted memory, the directory including:
      a root,
      a contact node below the root, the contact node being a parent node of a first replace all node, a first add node, and a first update node, and
      a calendar node below the root, the calendar node being a parent node of a second replace all node, a second add node, and a second update node;
   detecting a synchronization condition;
   converting the contact or the calendar information to a format compatible with the handset; and
   processing the contact or the calendar information in the selected directory location to synchronize the contact or the calendar information with existing contact or calendar information stored in a persistent memory in the handset, wherein the contact information in the first replace all node replaces the contact information of the handset and the calendar information in the second replace all node replaces the calendar information of the handset, the contact information in the first add node is added to the contact information of the handset and the calendar information in the second add node is added to the calendar information of the handset, and the contact information in the first update node updates the contact information of the handset and the calendar information in the second update node updates the calendar information of the handset.

2. The method of claim 1 wherein the step of converting the contact or the calendar information further comprises converting the contact or calendar information from a comma separated value (CSV) file format to a format suitable for the handset.

3. The method of claim 1 wherein the step of converting the contact or the calendar information further comprises converting the contact or calendar information from a virtual card (VCARD) file format to a format suitable for the handset.

4. The method of claim 1 wherein the step of converting the contact or the calendar information further comprises converting the contact or calendar information from a virtual calendar (VCAL) format to a format suitable for the handset.

5. The method of claim 1 wherein the synchronization condition occurs upon reset of the handset.

6. The method of claim 1 wherein the synchronization condition occurs upon receiving a selection in a user interface.

7. The method of claim 1 wherein the synchronization condition occurs upon start-up of the handset.

8. A method for synchronizing contact or calendar information between a handset and a computing device comprising:
   accessing contact or calendar information in a persistent memory of the handset;
   converting the contact or the calendar information from a format suitable for the handset to a common format;
   storing, in a directory location selected by a user, the contact or the calendar information in a directory on a media card, the directory including:

a root,
a contact node below the root, the contact node being a parent node of a first replace all node, a first add node, and a first update node, and
a calendar node below the root, the calendar node being a parent node of a second replace all node, a second add node, and a second update node;
receiving a selection of a remote location for the contact or the calendar information; and
storing the contact or the calendar information to the remote location, wherein the contact information in the first replace all node replaces contact information of the remote location and the calendar information in the second replace all node replaces calendar information of the remote location, the contact information in the first add node is added to contact information of the remote location and the calendar information in the second add node is added to calendar information of the remote location, and the contact information in the first update node updates contact information of the remote location and the calendar information in the second update node updates calendar information of the remote location.

9. The method of claim 8 wherein the step of accessing further comprises:
executing a program stored in the directory; and
sending a command.

10. The method of claim 9 wherein the command is a diag command or an AT command.

11. The method of claim 8 wherein the step of converting the contact or the calendar information further comprises converting the contact or calendar information to a comma separated value (CSV) file format.

12. The method of claim 8 wherein the step of converting the contact or the calendar information further comprises converting the contact or calendar information to a virtual card (VCARD) file format.

13. The method of claim 8 wherein the step of converting the contact or the calendar information further comprises converting the contact or calendar information to a virtual calendar (VCAL) format.

14. The method of claim 8 further comprising creating the directory.

15. The method of claim 14 wherein the step of creating a directory further comprises:
creating a directory for calendar information; and
creating a directory for contact information.

16. The method of claim 8 wherein the synchronization condition occurs upon reset of the handset or start-up of the handset.

17. The method of claim 8 wherein the synchronization condition occurs upon receiving a selection in a user interface.

18. The method of claim 8 wherein the remote location is a network server.

19. A method for synchronizing contact or calendar information between a handset and a new handset comprising:
accessing the contact or the calendar information in a persistent memory of the handset;
converting the contact or the calendar information from a format suitable for the handset to a common format;
storing, in a directory location selected by a user, the contact or the calendar information in a directory of a media card memory, the directory including:
a root,
a contact node below the root, the contact node being a parent node of a first replace all node, a first add node, and a first update node, and
a calendar node below the root, the calendar node being a parent node of a second replace all node, a second add node, and a second update node;
transferring the media card memory to a new handset;
detecting a synchronization condition on the new handset;
converting the contact or the calendar information on the media card to a format suitable for the new handset; and
storing the contact or the calendar information to a persistent memory in the new handset, wherein the contact information in the first replace all node replaces contact information of the new handset and the calendar information in the second replace all node replaces calendar information of the new handset, the contact information in the first add node is added to contact information of the remote location new handset and the calendar information in the second add node is added to calendar information of the new handset, and the contact information in the first update node updates contact information of the new handset and the calendar information in the second update node updates calendar information of the new handset.

20. The method of claim 19 further comprising deleting the contact or the calendar information from the media card memory after storing the contact or the calendar information to the persistent memory.

\* \* \* \* \*